United States Patent [19]

Schäty

[11] Patent Number: 4,561,146
[45] Date of Patent: Dec. 31, 1985

[54] PLASTIC FASTENER

[75] Inventor: Harald Schäty, Wetzlar, Fed. Rep. of Germany

[73] Assignee: USM Corporation, Farmington, Conn.

[21] Appl. No.: 539,646

[22] Filed: Oct. 6, 1983

[51] Int. Cl.$^4$ ............................................. A47G 27/02
[52] U.S. Cl. ................................................ 16/7; 16/4
[58] Field of Search ..................... 16/4, 7, 8; 24/90 B, 24/92, 94, 113 R

[56] References Cited

U.S. PATENT DOCUMENTS

| | | | |
|---|---|---|---|
| 572,566 | 12/1896 | Richardson | 16/4 |
| 1,718,844 | 6/1929 | White et al. | 24/94 |
| 1,930,611 | 10/1933 | Freter | 24/94 |
| 2,413,975 | 1/1947 | Janes | 24/94 |
| 4,035,874 | 7/1977 | Liljendahl | 24/90 B |
| 4,406,033 | 9/1983 | Chisholm et al. | 16/4 |

FOREIGN PATENT DOCUMENTS

| | | | |
|---|---|---|---|
| 132921 | 10/1919 | United Kingdom | 24/94 |
| 1236407 | 6/1971 | United Kingdom | |
| 2087229 | 5/1982 | United Kingdom | 16/4 |

Primary Examiner—Donald R. Schran
Assistant Examiner—James Wolfe
Attorney, Agent, or Firm—Aubrey C. Brine

[57] ABSTRACT

A plastic fastener for pushing axially onto a headed or threaded stud has a hollow shank, part of the wall of which is constituted by a flexible resilient finger. The finger has a deep step for latching under the head of the T-stud and opposite it is a window in the wall of the shank, the floor of the window forming a corresponding step to latch under the other side of the stud shoulder.

The fastener provides greater resistance to pull-off than has usually been found in fasteners having closed ended hollow shanks.

4 Claims, 3 Drawing Figures

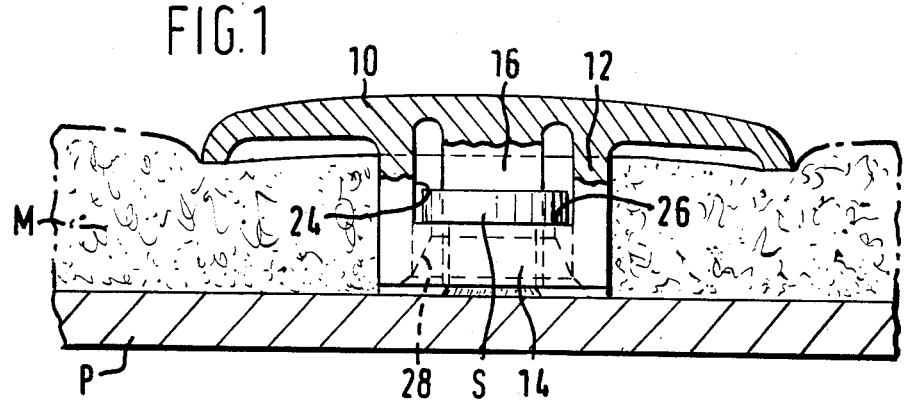
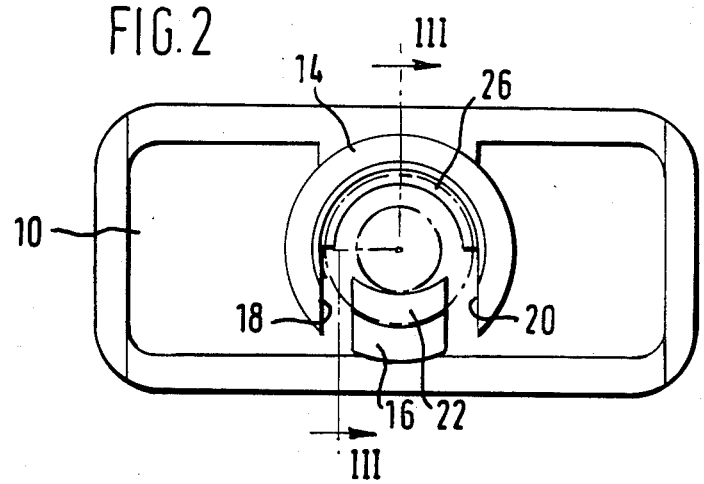
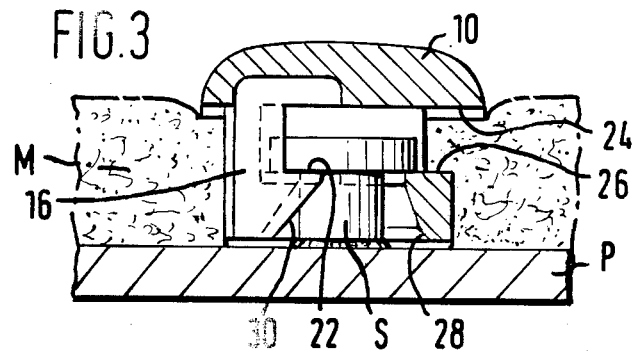

PLASTIC FASTENER

BACKGROUND OF THE INVENTION

The present invention is concerned with plastic fasteners, and more particularly with a plastic fastener having means for latching under a peripheral shoulder of a stud projecting from a surface and comprising a hollow shank within which the stud can be received and with an internal lip or lips to engage the shoulder of the stud.

Plastic fasteners of the foregoing kind for assembly on a T-stud, or studs with annular ribs or a screw thread constituting the peripheral shoulder of the stud, normally have a relatively narrow internal lip around the hollow shanks (or lips round sections of their shanks where the shanks are separated into two or more sections to provide greater resilience and flexibility enabling them to be more readily pushed axially onto studs). The depth of the lips is limited in practice because such fasteners are made by injection molding and, where the shank is closed at its head end, the fastener has had to have the capability of being pulled axially off the internal core of the mold cavity. Such a fastener is described, for example, in United Kingdom Patent Specification No. 1236407.

While fasteners as referred to above are widely used for a variety of purposes, including, for example, securing carpets and mats to the floors of motor vehicles to which suitable studs have been welded, and such fasteners provide adequate retention on the studs for such purposes, there are occasions when it is desired to push a plastic stud axially onto a headed or threaded stud, and obtain a significantly higher resistance to pull-off.

It is accordingly an object of the present invention to provide a plastic fastener for pushing onto a headed or threaded stud which has a higher resistance to pull-off than has been customary hitherto.

SUMMARY OF THE INVENTION

The foregoing object is achieved in accordance with this invention in that the shank of a fastener of the kind referred to is provided in part by a rigid skirt extending around at least 180°, but not all, of the shank and in part by a resilient finger in the gap produced between the ends of the skirt, and in that said lips as aforesaid are provided, one on said finger and one coplanar therewith on said skirt, the lip on said skirt being a continuation of a floor of a window through said skirt diametrically opposite said finger and at least as wide as said finger so that the lip on said finger may be formed in an injection molding operation by a side core member which also forms said window.

Preferably, the shank of a fastener in accordance with the invention is closed at its head end. Also, preferably, the internal edge of the lip on said finger at its center line is spaced from the axis of the shank by not more than half the internal radius of the shank. The skirt and finger may be bevelled internally at their free ends to facilitate assembly of the fastener on the stud.

Whereas the invention is described herein with reference to a fastener for holding carpets on floors of motor vehicles, it is to be understood that the head of the stud may take any suitable form, that is to say either for clamping the workpiece to the surface from which the stud on which the fastener is assembled projects, or for receiving some other article, for example a pipe or cable which it is desired to secure in a fixed position in relation to the stud. A fastener in accordance with the invention may be designed for application either to a T-stud or to a stud with screw or annular threads.

BRIEF DESCRIPTION OF THE DRAWINGS

There now follows a description of a fastener constructed in accordance with the invention and illustrative thereof, which is shown in the accompanying drawing, wherein:

FIG. 1 is a side elevational view, partly in section of the illustrative fastener;

FIG. 2 is a bottom plan view of the illustrative fastener; and

FIG. 3 is a view of the illustrative fastener taken on the line III—III of FIG. 2.

DESCRIPTION OF THE PREFERRED EMBODIMENT

Referring to the accompanying drawing, the illustrative fastener is injection molded from a resilient thermoplastic material, preferably nylon 6.6. It has a head 10 of roughly rectangular outline (though any other desired shape could have been chosen) slightly dished on its underside to provide a measure of clamping against the material M, for example a carpet, on which its margin bears when it is assembled on a headed or threaded stud, depicted, in this instance, as a T-stud S welded to a panel P.

The illustrative fastener has a hollow cylindrical shank 12, part of which provides a skirt 14 projecting rigidly from the underside of the head 10 and extends round more than 180° of the shank, and part of which is a resilient finger 16 also depending from the head 10 and accommodated between ends 18, 20 of the skirt 14.

In order that the finger 16 may have a deep lip 22 to latch under the head of a T-stud, the cavity in which the fastener was molded had a side core (not shown) which, by projecting sideways into the cavity from the opposite side from the finger, also forms a window 24 in the skirt 14. The window has a floor 26 coplanar with the lip 22, but projecting not so far as the lip 22 towards the axis of the shank. The lip 22 at its center line, in the case where the shank has an external diameter of 7.5 mm and internal diameter of 5.7 mm, is 1.15 mm from the axis of the shank (that is to say less than half the internal radius of the shank) whereas the floor 26 (which constitutes the lip of the skirt for latching under the head of the T-stud), at is center line, is 2.25 mm from the axis (which would be normal for the inner edge of the lip of a fastener of this kind as hitherto formed by an axial core in an injection molding machine).

For convenience of molding, the ends 18, 20 of the skirt 14 are spaced apart by the internal diameter of the shank 12, the floor 26 extending round an arc of 180° and the inner wall of the shank extending in two parallel planes from the ends of the floor at each side of the finger 16, from which they are spaced by 2 mm.

The skirt and finger have internal bevelled surfaces 28, 30 respectively at their free ends to facilitate guiding the fastener axially onto a stud.

The illustrative fastener is not unduly complicated or costly to manufacture and, while being readily assembled on a stud, is more firmly retained than is normally the case with carpet fasteners of this kind.

I claim:

1. A plastic fastener having means for latching under a peripheral shoulder of a stud projecting from a surface and comprising a hollow shank within which the stud can be received and with an internal lip or lips to engage the shoulder of the stud characterized in that the shank of the fastener is provided in part by a rigid skirt extending around at least 180°, but not all, of the shank and in part by a resilient finger disposed in a gap formed between the ends of said skirt, said lips being provided, one on said finger and one coplanar therewith on said skirt, an opening formed through said skirt diametrically opposite said finger providing a bottom floor surface, said lip on said skirt being a continuation of said floor surface, said opening being at least as wide as said finger to provide a window so that the lip on said finger may be formed in an injection molding operation by a side core member which also forms said window.

2. A plastic fastener according to claim 1 further characterized in that the shank is closed at its head end.

3. A plastic fastener according to claim 1 further characterized in that the internal edge of the lip on said finger at its center line is spaced from the axis of the shank by not more than half the internal radius of the shank.

4. A plastic fastener according to claim 1 further characterized in that the skirt and finger are bevelled internally at their free ends to facilitate assembly of the fastener on a stud.

* * * * *